B. A. GRAMM.
POWER TRANSMISSION MECHANISM.
APPLICATION FILED DEC. 27, 1913.
1,109,584.
Patented Sept. 1, 1914.
2 SHEETS—SHEET 2.
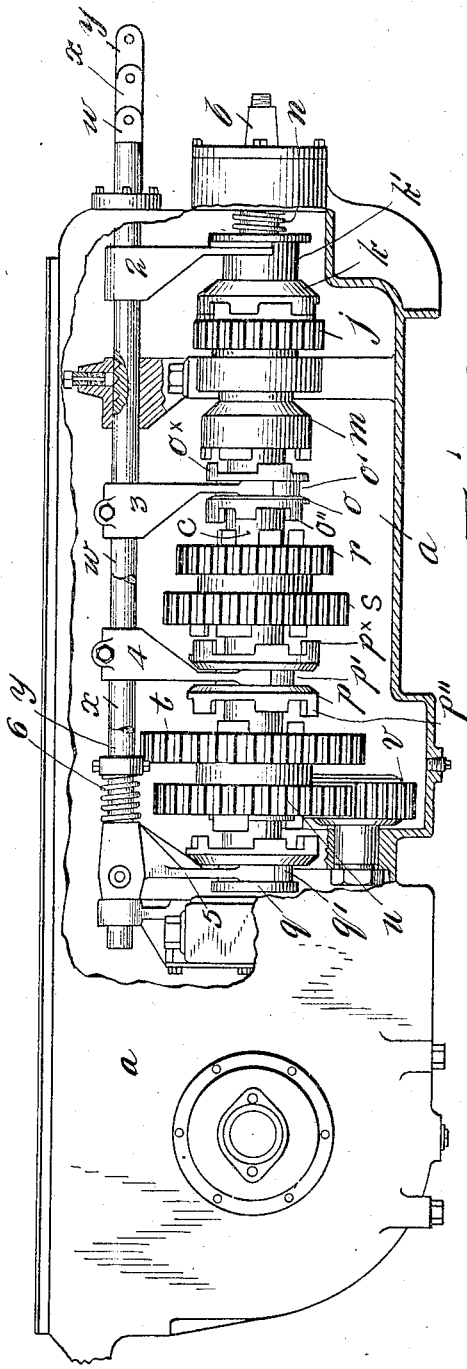
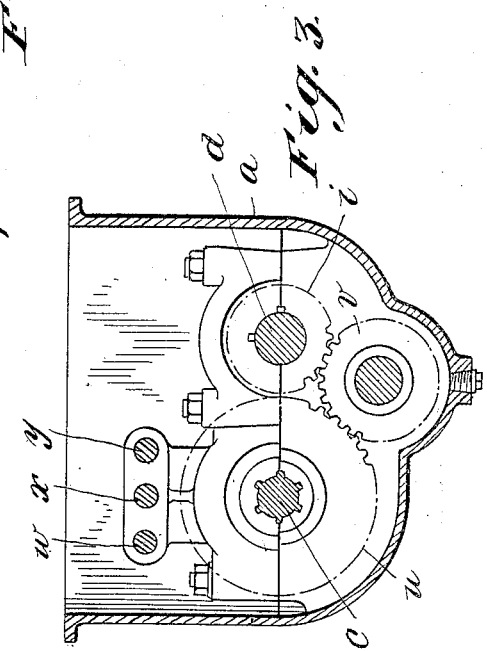
Witnesses:
M. Reimer.
M. Hamilton.
Benjamin A. Gramm Inventor
By his Attorney
James Hamilton

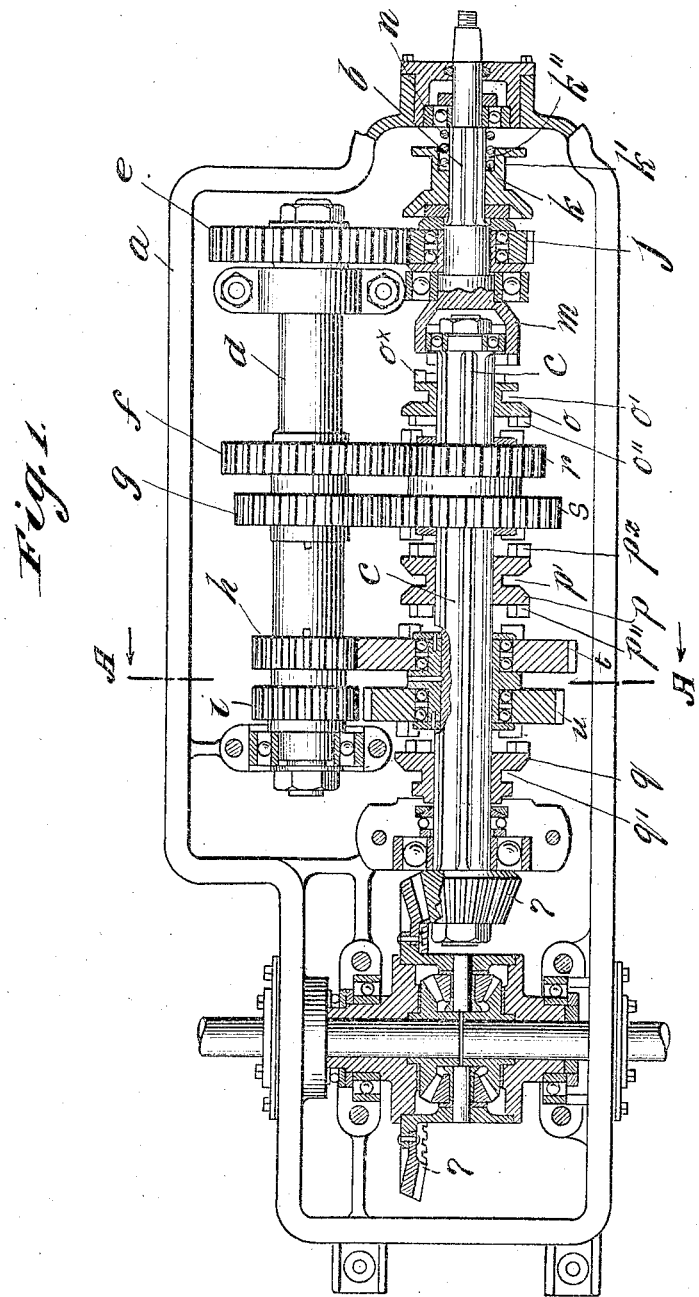

UNITED STATES PATENT OFFICE.

BENJAMIN A. GRAMM, OF LIMA, OHIO.

POWER-TRANSMISSION MECHANISM.

1,109,584. Specification of Letters Patent. Patented Sept. 1, 1914.

Application filed December 27, 1913. Serial No. 808,938.

*To all whom it may concern:*

Be it known that I, BENJAMIN A. GRAMM, a citizen of the United States of America, residing at Lima, in the county of Allen and State of Ohio, have invented certain new and useful Improvements in Power-Transmission Mechanism, of which the following is a specification, reference being had to the accompanying drawings.

This invention relates to improvements in power-transmission mechanism and particularly to improvements in power-transmission mechanism adapted for use in self-propelled vehicles; and an object of this invention is to provide a power-transmission mechanism of the character just referred to which will be simple in construction, comparatively cheap in manufacture and efficient, durable and readily manipulated in operation and use.

Another object of this invention is to provide a power transmission mechanism, the operation of which at high speed will be practically noiseless.

In the drawings illustrating the principle of this invention and the best mode now known to me of applying that principle, Figure 1 is a plan view, partly in section, of my new mechanism; Fig. 2 is a front elevation of the same; and Fig. 3 is a section on the line A—A of Fig. 1.

In the casing $a$ there are mounted the drive-shaft $b$, the transmission-shaft $c$ and and the counter-shaft $d$. On the latter shaft there are keyed or otherwise mounted fast the gears $e$, $f$ and the pinions $g$, $h$, $i$. On the drive-shaft $b$ there is loosely mounted a pinion $j$ which meshes with the gear $e$; and keyed upon this drive-shaft $b$, is the clutch-member $k$, formed with a peripheral or circumferential groove $k'$ and in its outer end face with a recess $k''$ into which extends one end of a coil-spring $n$ which tends normally to press the slidable clutch $k'$ to the left in Fig. 1 and thereby into clutching engagement with the hub of the pinion $j$. Upon the inner end of the drive-shaft $b$ there is formed a clutch element or member $m$. Upon the transmission shaft $c$ there are keyed the clutch-members $o$, $p$, $q$, which are formed, respectively, with circumferential grooves $o'$, $p'$, $q'$. The clutch-members $o$, $p$, are double-faced or double-acting. Loosely mounted upon the transmission-shaft $c$ are the pinion $r$ and the gears $s$, $t$, $u$. The pinion $r$ meshes with the gear $f$, the gear $s$ with the pinion $g$, and the gear $t$ with the pinion $h$. The reversing gear $u$ meshes with the pinion $i$ through the intermediary of the gear $v$ (Fig. 3).

Three horizontally-disposed clutch-controlling slide-rods $w$, $x$, $y$ are provided. Upon the rod $w$ are mounted the forks 2, 3, the fork 2 entering the groove $k'$ and straddling the clutch-member $k$, while the fork 3 enters the groove $o'$ and straddles the clutch-member $o$. Upon the intermediate clutch-shifting slide-rod $x$ is mounted the rod 4 which enters the groove $p'$ and straddles the clutch $p$; while upon the reversing-rod $y$ there is mounted the fork 5 which enters the groove $q'$ and straddles the clutch $q$. Around the reversing rod $y$ there is wound a coil-spring 6 which tends to press the rod $y$ and its attached fork 5 toward the left in Fig. 2, and thereby to safeguard, against the inadvertent throwing into gear of the reversing mechanism.

With the slide-rod $w$ in the position shown in Fig. 2, the clutch $k$ is in engagement with the hub of the pinion $j$ so that the driving-shaft $b$ is connected through the clutch $k$ with the pinion $j$ and drives the latter. Obviously when the pinion $j$ turns, and gear $e$ turns in this way the counter-shaft $d$ is rotated. If now the slide-rod $w$ be pushed to the left in Fig. 2, the fork 3 is thrown to the left and carries the face $o''$ of the clutch-member $o$ into clutching engagement with the hub of the pinion $r$; furthermore, this movement of the slide-rod $w$ causes the fork 2 to travel to the left but due to the width of the groove $k'$, this travel of the fork 2 is idle. The result of the manipulation of the slide-rod $w$ in this way is to cause power to be transmitted from the driving-shaft $b$ through the pinion $j$ and the gear $e$ to the counter-shaft $d$ and from the latter to the transmission-shaft $c$ through the gear $f$ and pinion $r$. If a higher rate of speed is desired, the slide-rod $w$ may now be shifted to the right in Fig. 2; and when this shifting is carried so far as to move the fork 3 to the right in Fig. 2 sufficiently to cause an engagement of the face $c^x$ of the clutch-member $o$ with the clutch-member $m$, on the end of the drive-shaft $b$, the fork 2 will have been moved so far to the right in Fig. 2 as to disengage the clutch $k$ from the hub of the pinion $j$ against the tension of the spring $n$. The transmission shaft $c$ will now be driven directly from the drive-shaft $b$ and at the speed of the latter; hence, when the high-speed mechanism is working or in gear, all the gears are motionless. Again, assuming the parts to be in the position shown in Fig. 2, if the slide-rod $x$ be moved to the right in Fig. 2, the face $p^x$ of the clutch $p$ will through the fork 4 be shifted into engagement with the hub of the gear $s$ so that the transmission-shaft $c$ will turn at substantially the same speed as that at which the counter-shaft $d$ turns; and if the slide-rod $x$ be shifted to the left in Fig. 2, the fork 4 will be displaced in the same direction and will throw the face $p''$ of the clutch $p$ into engagement with the hub of the gear $t$, whereby the speed of the transmission-shaft $c$ will be decreased. If it be desired to reverse the direction of rotation, the parts being in the position shown in Fig. 2, the slide-rod $y$ is moved to the right against the tension of the coil-spring 6 so as, through the fork 5, to throw the clutch $q$ into engagement with the reversing-gear $u$, whereupon the transmission-shaft $c$ will be driven from the counter-shaft through the train of gearing $i$, $v$, $u$, in a reverse direction.

It is to be observed when the automobile is being driven at high speed, the connection between the drive-shaft and the transmission-shaft is direct; that is, the drive is straight through with only the bevel-gears 7 running and the gears and pinions of the change-gear mechanism at rest. In this way there results a noiseless operation of the power-transmission mechanism at high speed.

I claim:

Power-transmission mechanism comprising a drive-shaft; a counter-shaft; a transmission-shaft; a toothed wheel loosely mounted on said transmission-shaft; a toothed wheel loosely mounted on said drive-shaft; toothed wheels which are mounted on said counter-shaft and one of which meshes with the toothed wheel upon said drive-shaft and the other of which meshes with the toothed wheel upon said transmission-shaft; a drive-shaft clutch-member slidable along said drive-shaft and rotatable therewith and normally held in clutching engagement with the toothed wheel loosely mounted thereon, said clutch-member being formed with an arm-receiving groove; a transmission-shaft clutch-member slidable along said transmission shaft and rotatable therewith and arranged when shifted in one direction to clutch thereto the toothed wheel loosely mounted thereon and, when shifted in the opposite direction, to clutch said drive-shaft and transmission-shaft together without the interposition of said toothed wheels; and a clutch-controlling shift-rod provided with a pair of clutch-controlling arms one of which enters said arm-receiving groove and disengages said drive-shaft clutch-member from the toothed wheel on said drive-shaft when the other of said arms clutches said drive-shaft and transmission shaft together; said groove being made wide enough to permit the first-named arm to travel idly when said other arm is shifted along said transmission-shaft to clutch thereto the toothed wheel loosely mounted thereon.

In testimony whereof I hereunto set my hand at Lima, Ohio, this 23rd day of December, 1913, in the presence of the two undersigned witnesses.

BENJAMIN A. GRAMM.

Witnesses:
ELEANOR FISHER,
H. E. WHEELER.